United States Patent

Amamoto et al.

[11] Patent Number: 6,056,865
[45] Date of Patent: May 2, 2000

[54] DRY CHEMICAL REPROCESSING METHOD AND DRY CHEMICAL REPROCESSING APPARATUS FOR SPENT NUCLEAR FUEL

[75] Inventors: Ippei Amamoto, Naka-gun; Miyuki Igarashi, Hitachinaka, both of Japan

[73] Assignee: Japan Nuclear Cycle Development Institute, Tokyo, Japan

[21] Appl. No.: 09/074,374

[22] Filed: May 8, 1998

[30] Foreign Application Priority Data

Jun. 3, 1997 [JP] Japan .................................. 9-144815

[51] Int. Cl.[7] .................................................. C25B 1/00
[52] U.S. Cl. .......................................... 205/353; 205/349
[58] Field of Search ............................... 205/353, 349, 205/350; 75/398, 399; 204/107, 227

[56] References Cited

U.S. PATENT DOCUMENTS

| | | | |
|---|---|---|---|
| 4,508,599 | 4/1985 | Ott et al. | 204/10 |
| 4,596,647 | 6/1986 | Miller et al. | 204/212 |
| 4,880,506 | 11/1989 | Ackerman et al. | 204/1.5 |
| 5,096,545 | 3/1992 | Ackerman | 204/1.5 |
| 5,650,053 | 7/1997 | Gay et al. | 204/212 |

FOREIGN PATENT DOCUMENTS

| | | |
|---|---|---|
| 307389 | 3/1991 | Japan . |
| 10111389 | 10/1996 | Japan . |

OTHER PUBLICATIONS

Nawada et al. "Numerical simulation of minor actinide recovery behavior in batch procesing of spent metallic fuel by electrofining," Adv. Chem Eng. Nucl. Process Ind. (1994). No month available.

Primary Examiner—Kathryn Gorgos
Assistant Examiner—J. Brown
Attorney, Agent, or Firm—Oliff & Berridge, PLC

[57] ABSTRACT

In a dry chemical reprocessing method, uranium type elements are electrolytically refined continuously. Molten cadmium in which these uranium type elements are dissolved is transferred to a rotating cathode electrolysis tank 30 for performing electrolytic refining. The rotating cathode electrolysis tank 30 is filled with molten cadmium, and a mixture of potassium chloride and lithium chloride. In the salt phase are placed a rotating cathode 32 and a receiving dish 36 for uranium type elements which deposit at the cathode, while in the molten cadmium phase a fixed anode 42 is installed. When uranium type elements deposited at the rotating cathode 32 have grown to at least a predetermined size, they are scraped off by a scraper 34 and collect in a receiving dish 36. These uranium type elements are sent to a U/salt separating tank 50 where uranium is separated from salts. The separated uranium and molten cadmium are aspirated by a pump 59, and sent to a Cd distiller 60 via a pipe 58a where the uranium type elements are recovered as their oxides and the cadmium is distilled off and recovered.

12 Claims, 2 Drawing Sheets

CONCEPT OF OXIDE FUEL DRY REPROCESSING PROCESS

CONCEPT OF OXIDE FUEL DRY REPROCESSING PROCESS

URANIUM RECOVERY USING ROTATING CATHODE

DRY CHEMICAL REPROCESSING METHOD AND DRY CHEMICAL REPROCESSING APPARATUS FOR SPENT NUCLEAR FUEL

BACKGROUND OF THE INVENTION

This invention relates to dry chemical reprocessing of spent nuclear fuel, to a dry chemical reprocessing apparatus, and in particular, to the reprocessing of spent nuclear fuel by a method of electrolytic refining in a molten salt for reprocessing and recovering uranium and/or transuranic elements in spent nuclear fuel.

DESCRIPTION OF THE RELATED ARTS

In the prior art, one technique for reprocessing spent nuclear fuel generated from a nuclear power plant and separating, refining and recovering the essential ingredients contained therein, is the Purex method, which is currently in wide commercial use. This Purex method comprises the steps of dissolving $UO_2$ and other oxides in aqueous nitric acid followed by co-decontamination, U-Pu distribution, Pu refining and U refining. However, according to the Purex method, many extractions are needed for distributing and refining U-Pu and separating fission products (FP) in each step. In addition, because aqueous solutions and the organic solvent known as tri-n-butyl phosphoric acid (TBP) used for extraction slow down neutrons, there is a severe limitation on the nuclear critical state, and more waste is generated because TBP is decomposed by radioactive rays. Therefore, in recent years, dry chemical reprocessing of spent nuclear fuel in fast breeder reactor power generators has been attempted by methods for refining molten salts by electrolysis. Such methods provide a means of concentrating and recovering useful fuel components such as uranium which is contained in spent nuclear fuel, and uranium-transuranic elements (hereafter, transuranic elements will be referred to as "TRU", and uranium and/or transuranic elements will be referred to as "uranium type elements").

In one current method, the anode is a molten cadmium phase, and spent nuclear fuel dissolved or contained in the molten cadmium phase is electrolytically deposited at a solid cathode introduced in a molten salt, for example, a molten salt phase such as potassium chloride (KCl)-lithium chloride (LiCl), as electrolyte. Uranium contained in the spent fuel is deposited at the cathode, and plutonium which is co-present is subsequently also deposited at the cathode and recovered. When spent nuclear fuel was reprocessed in this dry chemical reprocessing method, uranium type elements separate as dendrite structures (tree-like crystals which grow out like a tree with branches). However in the electrolytic refining of molten salts, dendrites grows rapidly from the solid cathode to the anode along the path of easiest current flow between the cathode and anode (molten cadmium phase), i.e. across the shortest distance between the solid cathode and the anode. This often caused electrical short circuits between the dendrite that had grown out from the solid cathode, and the molten cadmium phase (anode). Due to these short circuits, the electric current was not effectively used for electrolytic deposition, the current efficiency dropped, and efficient recovery of uranium (high recovery rate) could no longer be achieved. Hence in the prior art, a method was adopted wherein, after uranium had separated to some extent at the solid cathode, the electrolytic refining process was stopped, the cathode was raised, and the deposit was scraped off the cathode. However, when operation is often interrupted in this way, it is difficult to streamline dry chemical reprocessing of spent fuel and to improve productivity.

SUMMARY OF THE INVENTION

It is therefore an object of this invention, which was conceived in view of the aforesaid problems, to recover uranium type elements in dry chemical reprocessing without stopping operation of an electrolytic refining tank, i.e. without raising the solid cathode where uranium type elements have deposited, and to provide a cathode deposit recovery apparatus and recovery method suitable for dry chemical reprocessing which allows separation of salts contained in the uranium type elements. In order to resolve the aforesaid problems, the dry chemical reprocessing method for spent nuclear fuel and dry chemical reprocessing apparatus according to this invention have the following characteristics.

(1) A dry chemical reprocessing apparatus, wherein spent oxide fuel which is the starting material is reduced to metal and supplied to a two-phase electrolysis tank, the upper phase being a molten alkali salt and the lower phase being molten cadmium.

After having extracted elements in the spent nuclear fuel into the molten cadmium, electrolysis is performed with the molten cadmium as anode and a low carbon steel rod-shaped cathode using the molten alkali salt as electrolyte. When an electric current is passed between the electrodes, uranium-type elements which are extracted into the molten cadmium are deposited at the cathode. The cathode has a disk-shaped part, is free to rotate, and a scraper is installed which comes in contact with the deposit on the disk-shaped part when the cathode rotates. A receiving dish is further provided in the alkali phase below the cathode in the electrolysis tank to receive uranium-type elements which are scraped off by the scraper. Uranium-type elements and alkali salts which have collected in the dish in the electrolysis tank are then removed from the tank by a suction device. Therefore, by rotating the cathode while electric current is passed through the electrolysis tank, uranium-type elements which have deposited on the disk-shaped part of the cathode can be scraped off by the scraper. There is no need to raise the cathode when uranium-type elements had deposited on it and interrupt the electrolysis operation as was necessary in the prior art. The process can therefore be streamlined and productivity can be improved.

(2) A dry spent fuel reprocessing apparatus as described in (1) is further provided with a separating tank wherein the aspirated uranium-type elements are mixed with molten cadmium so as to separate them from alkali salts.

Uranium-type elements which have deposited on the rotating cathode are continuously scraped off by the scraper, collected in the receiving dish and continuously recovered. The uranium-type elements that collect in the receiving dish generally contain salts. When the uranium-type elements are supplied to the molten cadmium in the aforesaid separating tank, the uranium-type elements blend with the molten cadmium phase, and the salts which were contained in the uranium-type elements move into the salt phase of the U/salt separating tank. This makes it possible to separate the salts from the uranium-type elements and to refine the elements.

(3) A dry chemical reprocessing apparatus as described in (2), is provided with an alkali return pipe to return the alkali salts separated in the separating tank to the electrolysis tank.

Due to this return pipe, salts contained in the uranium-type elements which were deposited, can be separated, recovered and re-used in the electrolytic refining process. This makes the electrolytic refining process more economical.

(4) A spent nuclear fuel dry chemical reprocessing method using any of the apparatuses described in (1)–(3), and comprising:

a preparation/adjustment step wherein alkali salts comprising cadmium chloride and cadmium metal are introduced to form a two-phase system wherein the upper phase is molten alkali salts comprising cadmium chloride and the lower phase is molten cadmium, and a cathode and anode are respectively introduced into this system, a spent nuclear fuel supply step for supplying spent nuclear fuel reduced to metal, and a step wherein uranium-type elements in the spent nuclear fuel that were extracted into the molten cadmium phase are deposited at the cathode, a step wherein the cathode is rotated, uranium-type elements deposited on the cathode are continuously scraped off, and the uranium-type elements which are scraped off are collected in a receiving dish situated below the cathode, and a step wherein uranium-type elements that have collected in the receiving dish are transferred together with the aforesaid molten salts to a U/salt separating tank filled with molten alkali salts and molten cadmium, and the uranium-type elements are separated and recovered from the molten cadmium.

As the cathode is rotated while the current is passed during electrolytic refining, and uranium-type elements which are deposited on the disk-shaped part of the cathode are continuously scraped off and recovered, there is no need to raise the cathode with deposited elements and interrupt operation of the electrolysis tank as was done in the prior art. The electrolytic refining process can therefore be streamlined and productivity can be improved. As the uranium-type elements which separate on the rotating cathode are continuously scraped off and collected in the receiving dish, the elements are continuously recovered. However, the uranium-type elements which collect in the dish generally contain salts. These elements are therefore supplied to the molten cadmium in the aforesaid U/salt separating tank whereupon they mix with the molten cadmium, and the salts they contain move into the salt phase in the separating tank. In this way, the uranium-type elements can be separated from the salts and the elements are refined.

DESCRIPTION OF THE PRESENT INVENTION

A suitable embodiment of this invention will now be described.

Figure 1:
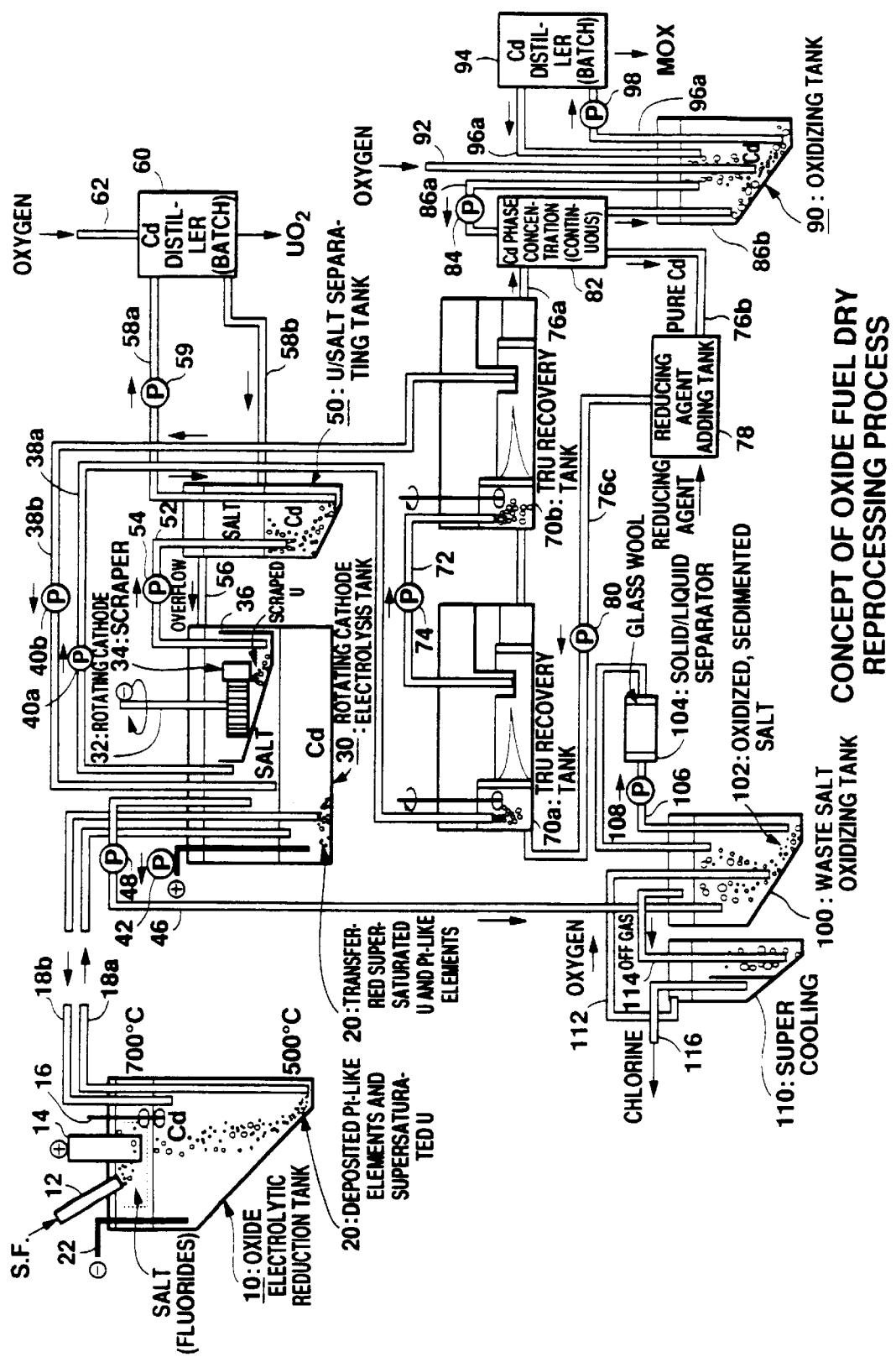
FIG. 1 is a figure describing, in schematic form, a dry chemical reprocessing step comprising a cathode deposit recovery device used for dry chemical reprocessing according to this invention.

An outline of the method of reprocessing spent nuclear fuel according to this invention will be explained referring to FIG. 1.

Reduction Step

In the dry chemical reprocessing of spent nuclear fuel according to this invention, refining is performed according to the same principle as that of electroplating, therefore the materials to be processed must have electrical conductivity. However, the starting materials for dry chemical reprocessing are oxides present in spent nuclear fuel such as uranium oxide and plutonium oxide, and as these oxides have no electrical conductivity, they must first be reduced to metals. In one example of a reduction step, spent nuclear fuel oxides are introduced into an oxide electrolytic reduction tank 10 through an injection port 12. This oxide electrolytic reduction tank 10 contains molten cadmium (Cd) and fluoride salts, the molten cadmium which has a high specific gravity being the lower layer. A fixed anode 14 is arranged in the salt phase of the oxide electrolytic reduction tank 10, and a fixed cathode 22 is arranged in the molten cadmium phase of the tank 10. When a current is passed between the fixed electrode 14 and fixed cathode 22, lithium fluoride (LiF) for example is reduced to Li metal, and oxides of uranium-type elements are reduced by this Li metal. Reduced platinum-like transition elements and supersaturated uranium (U) 20 are deposited in the molten cadmium phase.

Figure 2:
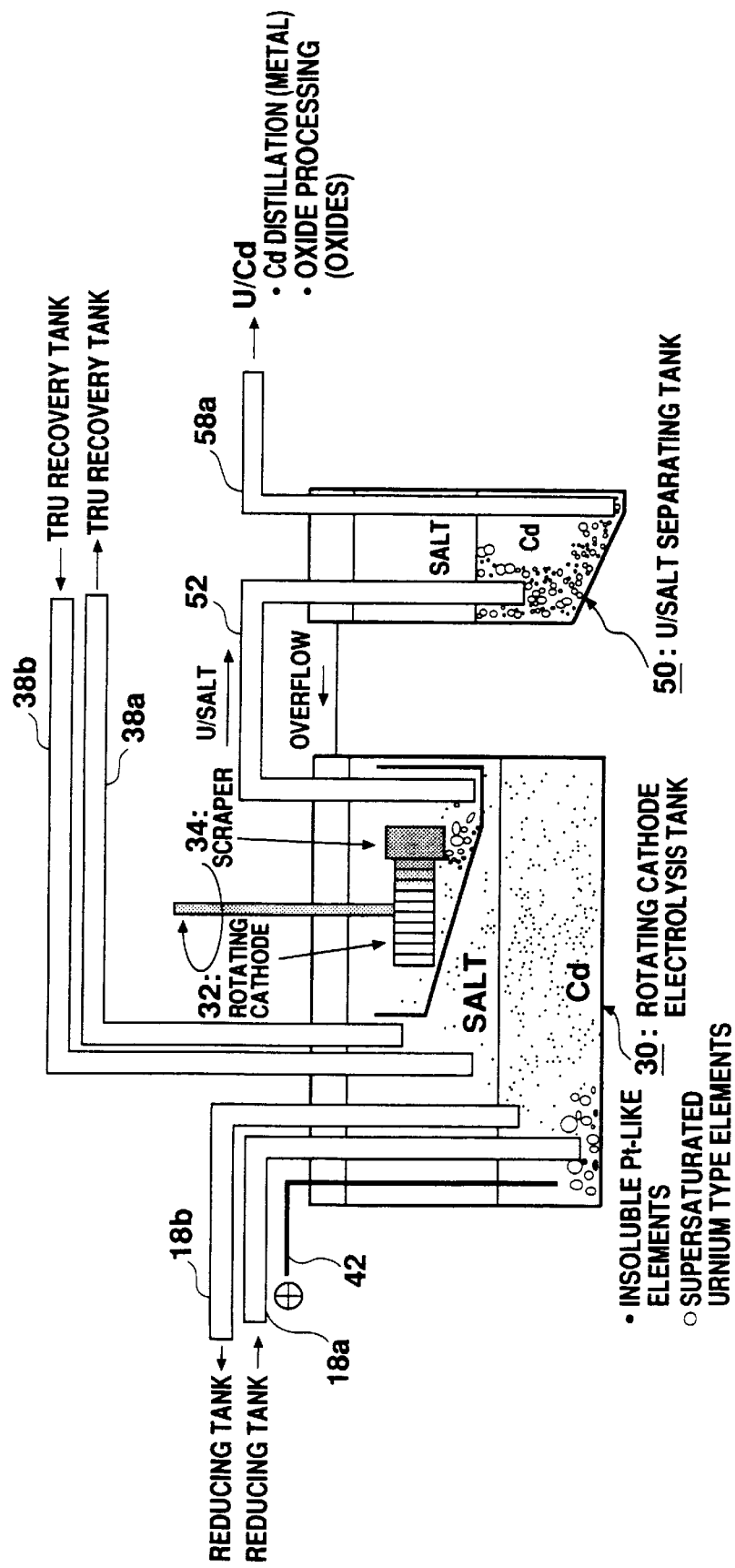
FIG. 2 is a figure describing, in schematic form, a device for performing electrolytic refining in a cathode deposit recovery device used for dry chemical reprocessing according to this invention.

Next, a cathode deposit recovery apparatus comprising a rotating cathode electrolysis tank 30, U/salt separating tank 50 and Cd distiller 60 which are characteristic features of this invention, will be described under "electrolytic refining step" and "distilling step" below with reference to FIG. 1 and FIG. 2.

Electrolytic Refining Step

The molten cadmium in which uranium-type elements were dissolved in the oxide electrolytic reduction tank 10 and the reduced transition elements and supersaturated uranium (U) 20 are transferred by a pump, not shown, via a suction pipe 18a to a rotating cathode electrolysis tank 30 to undergo electrolytic refining.

This rotating cathode electrolysis tank 30 is filled with molten cadmium (Cd), and salts comprising a mixture of potassium chloride (KCl) and lithium chloride (LiCl). The molten cadmium (Cd) which has a high specific gravity is the lower phase.

A rotating cathode 32 and a receiving dish 36 for collecting uranium which deposits at the cathode 32 are installed in the salt phase in the rotating cathode electrolysis tank 30, and a fixed anode 42 is installed in the molten cadmium phase in the rotating cathode electrolysis tank 30. Herein, the "salts" and molten cadmium act as catalysts in the displacement of uranium ions and TRU ions.

When a current is passed between the rotating cathode 32 and fixed anode 42, uranium dissolved in the molten cadmium is preferentially ionized, and deposited at the rotating cathode 32. The temperature in this electrolytic refining is preferably approximately 500° C., which is the optimum temperature to dissolve uranium in cadmium. The concentration of uranium in the molten cadmium phase of this embodiment preferably lies within a range of 0.5 to 2.5 wt %. A suitable balance is maintained because the same amount of uranium moves into the molten salt phase from the molten cadmium phase as the amount of uranium in the molten salt phase consumed by electrolytic deposition at the rotating cathode 32. However, when the concentration is less than 0.5 wt %, the uranium transport rate into the molten salt phase cannot match the electrolysis rate, so the current reaches an upper limit and it is difficult to maintain the desired electrolysis rate. In addition, when the reaction is performed at a concentration of less than 0.5. wt %, the electrolysis potential must be increased on the positive side. Herein, by setting the electrolysis potential to a high positive value, TRU are made to deposit at the same time. If the potential is too positive, substances other than uranium, e.g. lithium ions, deposit at the rotating cathode and lower the quality of the deposit obtained. 2.5 wt % on the other hand is the dissolution limit (saturation concentration) of uranium in the molten cadmium phase, and if this limit is exceeded, the uranium separates out from the molten cadmium phase.

When at least a predetermined amount of uranium has grown out at the cathode 32, it is scraped off by a scraper 34 and collects in the receiving dish 36. The uranium which has collected is aspirated by a pump 54, and transferred to the U/salt separating tank 50 via a pipe 52.

In this embodiment, the speed of the rotating cathode is preferably 1 to 10 rpm. When the speed was less than 1 rpm, the uranium crystals grew too large, and electrical short circuits sometimes occurred between the dendrite growing out at the cathode and the molten cadmium (anode). Due to these short circuits, electric current was not effectively used for electrolytic deposition, the current efficiency dropped, and uranium could no longer be effectively recovered (at a high rate). On the other hand when the speed exceeded 10 rpm, the uranium crystals were scraped off by the scraper 34 before they had a chance to grow, and were converted to fine particles. Another factor when the rotation speed is too high is that separation of crystals is difficult, and as the uranium crystals supplied to the U/salt separating tank 50 then also contain a large amount of salts, the efficiency of uranium recovery falls.

The U/salt separating tank 50 contains salts (a KCl—LiCl mixture) and molten cadmium, and it is maintained at a temperature of approximately 500° C. The uranium containing salt impurities from the rotating cathode electrolysis tank 30 is supplied as necessary to the molten cadmium phase by a pipe 52. Only the uranium dissolves in the cadmium phase, and forms an alloy with the cadmium. The salts contained in the uranium therefore move into the salt phase, and are separated from the uranium. If the salts exceed a certain volume, they are returned to the electrolysis tank 30 via an overflow line 56.

Distillation Step

In the U/salt separating tank 50, uranium which has alloyed with cadmium is aspirated by a pump 59 and transported to a Cd distiller 60 via a pipe 58a. Oxygen is introduced into this Cd distiller 60 via a pipe 62, whereupon cadmium distills off (e.g. 1400° C.) and the uranium dissolved in the cadmium is left in the form of uranium oxides (e.g. $UO_2$) which are recovered. The distilled cadmium on the other hand is returned to the U/salt separating tank 50 via a pipe 58b.

TRU Recovery Step

Minute amounts of uranium-type elements remaining in the salt phase in the rotating cathode electrolysis tank 30 are aspirated by a pump 40a, and transported to TRU recovery tanks 70a, 70b via pipes 38a, 38b. Salts and minute amounts of uranium-type elements are separated using cadmium containing a dissolved reducing agent in the order of these TRU recovery tanks 70a, 70b. A Cd phase concentrator 82 concentrates cadmium in which uranium-type elements separated in the TRU recovery tanks 70a, 70b are dissolved, and this is supplied to an oxidizing tank 90.

Oxidizing Step

The oxidizing tank 90 is filled with cadmium, and oxygen is introduced into it via a pipe 92. Uranium and TRU dissolved in the cadmium are oxidized by oxygen in the oxidizing tank 90, thereby forming uranium oxide and TRU oxides. This uranium oxide and TRU oxides are aspirated together with cadmium by a pump 98, and transported to a Cd distiller 94 via a pipe 96a. In the Cd distiller 94 the cadmium is separated from the uranium oxide and TRU oxides, the uranium oxide and TRU oxides are recovered as MOX, and the cadmium which distills off is returned to the oxidizing tank 90. Due to the oxidizing tank 90, almost all the elements dissolved in the cadmium are recovered as oxides.

Cd Recycling Step

The substantially pure cadmium discharged from the Cd phase concentrator 82 is transported to a reducing agent adding apparatus 78 via a pipe 76b. The reducing agent adding apparatus 78 is an apparatus for adding a reducing agent to the molten cadmium. The cadmium to which the reducing agent is added is sent to the TRU recovery tank 70 via a pipe 76.

Salt Purifying Step

Finally, the salt phase in the rotating cathode electrolysis tank 30 is aspirated by a pump 48 and sent to a waste salt oxidizing tank 100 via a pipe 46. This salt phase contains residual lanthanoids and actinoids in the form of chlorides. The salt phase is introduced into the waste salt oxidizing tank 100, and oxygen is led into the tank 100 via a pipe 112 so that only plutonium salts in the lanthanoids and actinoids in the waste salts are oxidized. Subsequently, the waste salts are aspirated together with the oxides by a pump 108 and sent to a solid/liquid separator 104. Here, oxides are separated from salts, and waste salts alone are returned to the waste salt oxidizing tank 100. Chlorine from the salts volatilizes in the waste salt oxidizing tank 100, and is sent to a supercooling device 110 as off gas via a pipe 114. In this supercooling device 110 the chlorine is supercooled, and the chlorine from which impurities have been removed is discharged from a pipe 116.

According to this embodiment, the molten salt phase was a potassium chloride-lithium chloride system, but other molten salt systems may be used such as potassium chloride-sodium chloride, cesium chloride-sodium chloride, potassium chloride-lithium chloride-sodium chloride, calcium chloride-barium chloride-lithium chloride-sodium chloride and calcium-chloride-barium chloride-lithium chloride-potassium chloride.

DESCRIPTION OF THE ACTUAL EXAMPLES

Next, this invention will be described in more detail referring to actual examples. The rotating cathode electrolysis tank 30, U/salt separating tank 50 and Cd distiller 60 have the construction shown in FIG. 1 and FIG. 2, and the specification of the system was as follows:

Specification of Tanks

Rotating Cathode Electrolysis Tank 30
   volume: 200 liters, material: low carbon steel U/salt Separating Tank 50
   volume: 3 liters, material: SUS304

Cd Distiller 60
   volume: 1.5 liters, material: SUS304

Example 1

100 kg of cadmium metal was introduced into an electrolysis tank 30, and after raising the temperature to melt the cadmium, 2 kg of uranium was dissolved in the molten cadmium. The volume of molten salt was 120 liters. The speed of a rotating cathode 32 was 10 rpm. The U/salt separating tank 50 contained 900 ml of molten salt (KCl—LiCl mixture) and 1156 ml of molten cadmium, and the temperature was maintained at approximately 500° C. The uranium containing salt impurities from the electrolysis tank 30 was supplied to the U/salt separating tank 50 by a pipe 52 at a rate of 15 ml/min.

From the U/salt separating tank 50, the uranium dissolved in the cadmium was aspirated by a pump 59 and sent to a Cd distiller 60 at a rate of 20.8 ml/min via a pipe 58a. In the Cd distiller 60, oxygen was introduced at a rate of 0.13 mol/min via a pipe 62, and the uranium was oxidized. The Cd distilled off at 1400° C., and therefore the uranium oxide was recovered.

The results of recovering the spent nuclear fuel are shown in Table 1.

TABLE 1

| | Spent nulear fuel composition | Molten cadmium phase in electrolysis tank | Cadmium phase in U/salt separating tank |
|---|---|---|---|
| | | Units: g/h Figures in brackets: mol/h | |
| Uranium | 2,000 (8.40) | 1801.5 (7.56) | 1,800 (7.56) |
| Plutonium | 502.4 (2.10) | 3.77 (0.02) | 0 |
| Cadmium | 0 | 0 | 10000 (88.97) |
| Lithium chloride | 0 | 402.1 (9.46) | 0 |
| Potassium chloride | 0 | 1057.9 (14.2) | 0 |
| Alkali/alkaline earth elements[1] | 75.38 | 0.57 | 0 |
| Lanthanoid elements[2] | 51.42 | 0.39 | 0 |
| Actinoid elements[3] | 11.45 | 0.09 | 0 |
| Transition/Pt-like elements[4] | 161.46 | 1.21 | 0 |

Processing capacity: 68 kgHM/day (48 kgU/day)
Operating method: 4 days-30 days continuous operation, 1 day waste salt processing
Note:
[1]alkali/alkaline earth elements: Ba, Rb, Sr, Cs
[2]Lanthanoid elements: Sm, La, Ce, Pr, Nd, Y
[3]Actinoid elements: Am, Cm, Np (excepting U, Pu)
[4]Transition/Pt-like elements: Zr, Nb, Mo, Tc, Rh, Pd, Ru Hence, according to the spent nuclear fuel dry chemical reprocessing apparatus and dry chemical reprocessing method according to the present invention, uranium can be efficiently refined by electrolysis without stopping the operation of the electrolysis tank.

This invention is moreover not limited to the aforesaid construction.

As described hereabove, in the cathode deposit recovery apparatus using the dry chemical reprocessing method of this invention, the cathode is slowly rotated while a current is passed during electrolysis, and uranium type elements which have deposited on the disk-shaped part of the cathode are scraped off by a scraper. It is therefore unnecessary to raise the cathode with deposits and interrupt the operation of the electrolysis tank as was required in the prior art. The electrolytic refining step can therefore be streamlined and productivity can be further improved.

The uranium type elements deposited on the cathode are scraped off by the scraper continuously, collected in a receiving dish, and recovered. These uranium type elements which collect in the dish generally contain salts. They are therefore supplied to molten cadmium in the aforesaid separating tank, whereupon the uranium type elements dissolve in the molten cadmium phase and the salts contained in the uranium-type elements pass into the salt phase in the separating tank. The salts are thus separated from the uranium type elements, and the uranium type elements are purified.

What is claimed:

1. A dry chemical reprocessing apparatus wherein a spent nuclear fuel starting material is reduced to metal, supplied to an electrolysis tank comprising a molten alkali salt as an upper phase and molten cadmium as a lower phase, elements in said spent nuclear fuel are extracted into said molten cadmium, an electric current is passed between two electrodes in the electrolysis tank wherein said molten cadmium is the anode and a low carbon steel rod fixed in said molten alkali salt phase is the cathode, and uranium and/or transuranic elements extracted into said molten cadmium are deposited at said cathode by electrolysis and recovered, wherein said apparatus including:

said cathode said cathode having a disk-shaped part and being supported to freely rotate in said electrolysis tank;

a scraper arranged in said electrolysis tank such that the scraper contacts with the deposit on said disk-shaped part of said cathode when said cathode rotates;

a receiving dish disposed in said molten alkali salt phase underneath said cathode in said electrolysis tank to receive uranium and/or transuranic elements scraped off of said cathode by said scraper during rotation of said cathode;

an aspirator provided to aspirate uranium and/or transuranic elements and alkali salts that have collected in said receiving dish in said electrolysis tank, and to remove the uranium and/or transuranic elements and alkali salts from said electrolysis tank; and wherein said uranium and/or transuranic elements are recovered.

2. A dry chemical reprocessing apparatus as defined in claim 1, comprising a separating tank for separating uranium and/or transuranic elements from said alkali salts, and said aspirated uranium and/or transuranic elements are further mixed with molten cadmium in said tank.

3. A dry chemical reprocessing apparatus as defined in claim 2, comprising an alkali salt return pipe to return said alkali salts separated in said separating tank to said electrolysis tank.

4. A dry chemical reprocessing method using a dry chemical reprocessing apparatus as defined in claim 3, comprising:

forming a two-phase system in said electrolysis tank wherein molten alkali salts comprising cadmium chloride are the upper phase and molten cadmium is the lower phase by introducing alkali salts comprising cadmium chloride and cadmium metal into said tank, and inserting a cathode and anode into said two-phase system;

supplying spent nuclear fuel reduced to metal;

depositing uranium and/or transuranic elements in the spent nuclear fuel extracted into said molten cadmium phase at said cathode;

continuously scraping off said deposited uranium and/or transuranic elements from said cathode while said cathode is rotated, and collecting said uranium and/or transuranic elements which have been scraped off in a receiving dish disposed underneath said cathode; and separating said uranium and/or transuranic elements from said molten cadmium phase by transferring said uranium and/or transuranic elements that have collected in said receiving dish together with said molten alkali salts to a salt/uranium separating tank filled with molten alkali salts and molten cadmium.

5. A dry chemical reprocessing apparatus as defined in claim 2, comprising a Cd distiller for recovering said uranium and/or transuranic elements in the form of their oxides by introducing said uranium and/or transuranic elements alloyed with cadmium that has been separated in said separating tank, introducing oxygen at the same time and distilling said cadmium.

6. A dry chemical reprocessing method using a dry chemical reprocessing apparatus as defined in claim 5, comprising:

forming a two-phase system in said electrolysis tank wherein molten alkali salts comprising cadmium chloride are the upper phase and molten cadmium is the lower phase by introducing alkali salts comprising cadmium chloride and cadmium metal into said tank, and inserting a cathode and anode into said two-phase system;

supplying spent nuclear fuel reduced to metal;

depositing uranium and/or transuranic elements in the spent nuclear fuel extracted into said molten cadmium phase at said cathode;

continuously scraping off said deposited uranium and/or transuranic elements from said cathode while said cathode is rotated, and collecting said uranium and/or transuranic elements which have been scraped off in a receiving dish disposed underneath said cathode; and separating said uranium and/or transuranic elements from said molten cadmium phase by transferring said uranium and/or transuranic elements that have collected in said receiving dish together with said molten alkali salts to a salt/uranium separating tank filled with molten alkali salts and molten cadmium.

7. A dry chemical reprocessing method using a dry chemical reprocessing apparatus as defined in claim 2, comprising:

forming a two-phase system in said electrolysis tank wherein molten alkali salts comprising cadmium chloride are the upper phase and molten cadmium is the lower phase by introducing alkali salts comprising cadmium chloride and cadmium metal into said tank, and inserting a cathode and anode into said two-phase system;

supplying spent nuclear fuel reduced to metal;

depositing uranium and/or transuranic elements in the spent nuclear fuel extracted into said molten cadmium phase at said cathode;

continuously scraping off said deposited uranium and/or transuranic elements from said cathode while said cathode is rotated, and collecting said uranium and/or transuranic elements which have been scraped off in a receiving dish disposed underneath said cathode; and separating said uranium and/or transuranic elements from said molten cadmium phase by transferring said uranium and/or transuranic elements that have collected in said receiving dish together with said molten alkali salts to a salt/uranium separating tank filled with molten alkali salts and molten cadmium.

8. A dry chemical reprocessing apparatus as defined in claim 1, wherein the rotation speed of said disk-shaped cathode lies within a range of 1 to 10 rpm.

9. A dry chemical reprocessing method using a dry chemical reprocessing apparatus as defined in claim 1, comprising:

forming a two-phase system in said electrolysis tank wherein molten alkali salts comprising cadmium chloride are the upper phase and molten cadmium is the lower phase by introducing alkali salts comprising cadmium chloride and cadmium metal into said tank, and inserting a cathode and anode into said two-phase system;

supplying spent nuclear fuel reduced to metal;

depositing uranium and/or transuranic elements in the spent nuclear fuel extracted into said molten cadmium phase at said cathode;

continuously scraping off said deposited uranium and/or transuranic elements from said cathode while said cathode is rotated, and collecting said uranium and/or transuranic elements which have been scraped off in a receiving dish disposed underneath said cathode; and separating said uranium and/or transuranic elements from said molten cadmium phase by transferring said uranium and/or transuranic elements that have collected in said receiving dish together with said molten alkali salts to a salt/uranium separating tank filled with molten alkali salts and molten cadmium.

10. A method for dry chemical reprocessing of spent nuclear fuel as defined in claim 9, wherein the electrolysis temperature in during the electrolytic refining is approximately 500° C.

11. A method for dry chemical reprocessing of spent nuclear fuel as defined in claim 9, wherein the uranium concentration in said molten cadmium phase lies within a range of 0.5 to 2.5 wt %.

12. A method for dry chemical reprocessing of spent nuclear fuel as defined in claim 9, wherein the temperature of said uranium/salt separating tank for separating uranium and/or transuranic elements from said molten cadmium phase is maintained at approximately 500° C.

* * * * *